Patented May 27, 1952

2,598,559

UNITED STATES PATENT OFFICE 2,598,559

INTERMEDIATE COMPOUNDS IN THE SYNTHESIS OF DEHYDROCORTICOSTERONE

Edward C. Kendall, Rochester, Minn., assignor to Research Corporation, New York, N. Y., a corporation of New York No Drawing. Application November 21, 1949, Serial No. 128,687

9 Claims. (Cl. 260—397.4)

In my application Serial No. 653,176 filed March 8, 1946, now Patent No. 2,541,074, I described a process for the degradation of the side chain in the 17-position of compounds derived from desoxycholic acid. The present application is a continuation-in-part of said application and of my application Serial No. 733,188 filed March 7, 1947 and Serial No. 51,488 filed September 27, 1948, now both abandoned, and relates more particularly to the process disclosed in said application for degrading the side chain in 17-position by the use of bromosuccinimide.

In particular the present application relates to the preparation of $3(a)$-acyloxy - 11 - keto - 12-bromo - 24,24 - diphenyl-$\Delta^{20:22,23:24}$-choladienes by the action of N-bromosuccinimide upon $3(a)$-acyloxy-11-keto-12-bromo - 24,24 - diphenyl-$\Delta^{23}$-cholenes.

In this application I shall use the same numbering of the compounds as in the parent application.

The following specific example is illustrative of the principles of the invention and shows the method of the invention as a step in the production of $3(a)$-acyloxy-11,20-diketopregnanes from 3,9-epoxy-11-keto-24,24-diphenyl-$\Delta^{23}$-cholene.

Other $3(a)$-acyloxy derivatives may be used in place of the $3(a)$-acetoxy-cholene (29) used in the specific example. For example, $3(a)$-esters of aliphatic and aromatic acids such as propionic, butyric, benzoic and p-nitrobenzoic acids may be used thereby producing the corresponding $3(a)$-acyl esters of the choladiene (31).

$3(a)$-acetoxy-11-keto - 12 - bromo - 24,24 - diphenyl-$\Delta^{23}$-cholene (29) from 3,9-epoxy-11-keto-24,24-diphenyl-$\Delta^{23}$-cholene (15).—25.00 g. of 3,9-epoxy-11-keto - 24,24 - diphenyl-$\Delta^{23}$-cholene was dissolved in 31 ml. of dry alcohol-free chloroform and 31 ml. of acetic anhydride was added. The reaction mixture was cooled in a Dry Ice-acetone bath and 125 g. of dry hydrogen bromide was introduced. The flask was sealed at Dry Ice temperature and then placed in an ice bath for 17 hours. The flask was cooled in a Dry Ice-acetone bath and the solution was poured onto chipped ice. Chloroform was added, the aqueous phase was separated and the organic phase was washed with water, sodium carbonate, and again with water. The chloroform solution was filtered through sodium sulfate, concentrated in vacuo to a small volume and diluted with methanol. The crystals which formed were filtered and washed with methanol. Yield: 24.68 g.=79.5 per cent. M. P.=176.5–178°. A sample recrystallized three times from acetone-water melted at 178–179°. $(a)_D = +18° \pm 2°$ (29.1 mg. in 3.00 ml. chloroform).

In another run in which 5.00 g. of 3,9-epoxy-11-keto-24,24-diphenyl-$\Delta^{23}$-cholene in 6 ml. of chloroform and 6 ml. of acetic anhydride was treated with 27 g. of dry hydrogen bromide under similar conditions except that the product was crystallized from chloroform-petroleum ether the crude yield was somewhat higher.

Crop I.—4.32 g.=69.5 per cent; M. P. 175–176°.
Crop II.—1.14 g.=18 per cent; M. P. 169–171°.
Crop III.—0.20 g.=3 per cent; M. P. 165–169°.

After recrystallizing crops II and III by dissolving in a small amount of benzene, adding petroleum ether and concentrating, 1.16 g. (18.6 per cent) material which melted at 175–176° was obtained.

$3(a)$-acetoxy-11-keto - 12 - bromo - 24,24 - diphenyl - $\Delta^{20:22,23:24}$ - choladiene (31) from $3(a)$-acetoxy-11-keto-12-bromo - 24,24 - diphenyl-$\Delta^{23}$-cholene (29).—9.476 g. (0.015 mole) of $3(a)$-acetoxy-11-keto-12-bromo - 24, - 24-diphenyl-$\Delta^{23}$-cholene (M. P. 176–177°) was dissolved in 100 ml. of purified carbontetrachloride in a 300 ml. round bottom flask and the solution was heated to boiling. 2.675 g. (0.015 mole) of N-bromosuccinimide was added and the solution was refluxed 20 minutes with the flask in contact with a 200-watt bulb. The solution was cooled to room temperature and 5.0 g. of sodium acetate in 100 ml. of glacial acetic acid was added and the solution was concentrated in vacuo to about 25 ml. 50 ml. of glacial acetic acid was added and the solution was concentrated in vacuo to about 25 ml. and refluxed 30 minutes. The solvent was removed in vacuo and the residue was distributed between benzene and water. The benzene solution was washed with water, sodium carbonate and with water, and filtered through sodium sulfate. After removal of the solvent in vacuo the residue crystallized from acetone - methanol. Yield: 6.82 g., M. P. 170–172°; 0.977 g., M. P. 147–156°. After two recrystallizations from acetone-water the second crop of crystals weighed 485 mg. and melted at 170–171°. A sample of the first crop recrystallized four times from acetone, melted at 179–180°.

The product is not pure $3(a)$-acetoxy-11-keto-12-bromo - 24,24 - diphenyl-$\Delta^{20:22,23:24}$-choladiene (31) but apparently contains about 20 to 25 per cent of the starting material $3(a)$-acetoxy-11-keto-12-bromo-24,24-diphenyl- $\Delta^{23}$-cholene (29). Compound 31 can be separated from this mixture by treatment with bromosuccinimide which results in the introduction of bromine at the 21 carbon. This bromine derivative of compound 31 can be separated in pure form.

The preparation of the 12,21 dibromo compound is as follows: The crude "diene" (31) obtained from 80 g. "ethylene" (29) was dissolved in 960 ml. carbon tetrachloride, mixed with 23.52 g. of 96 per cent bromosuccidimide and boiled for 20 minutes over a light bulb, cooled and filtered. The filtrate was brought to almost complete dryness and petroleum ether added. 63.0 g. (70.2 per cent) of crystalline material separated. Recrystallization from about 200 ml. hot benzene and 200 ml. hot petroleum ether yielded a first crop of 49.0 g. (54.7 per cent) with E=377 at 325 mu in chloroform and a second crop of 6.6 g. (6.9 per cent) with E=364.

$3(a)$-acetoxy-11,20-diketo-12 - bromopregnane (32) from $3(a)$-acetoxy-11-keto-12-bromo-24,24-diphenyl-$\Delta^{20:22,23:24}$-choladiene (31).—5.80 g. (0.0092 mole) of crude $3(a)$-acetoxy-11-keto-12-bromo-24,24-diphenyl-$\Delta^{20:22,23:24}$-choladiene (M. P. 171-172°) was dissolved in 37 ml. of alcohol-free chloroform and 55 ml. of glacial acetic acid and 9.2 ml. of water was added. The solution was cooled to 10° and 19.6 ml. of 8.5 N chromic acid (18 equiv.) in 85 per cent acetic acid-15 per cent water was added while the solution was being stirred vigorously. The temperature rose to 15°. After fifteen minutes the temperature had fallen to 10° and 16.6 ml. of 10 N sulfuric acid (18 equiv.) was added. The reaction mixture was then stirred 105 minutes at 10-15°, diluted with a large volume of water and extracted with 3 portions of chloroform. The chloroform solution was washed with water and evaporated to dryness in vacuo. The residue was dissolved in ether and a mixture of ice and aqueous potassium hydroxide was added. A crop of fine crystals formed. Benzene was added and part of the crystalline material dissolved. The solution was filtered and the aqueous phase was acidified with hydrochloric acid. (The acidic fraction weighed 148 mg.) The organic phase was washed with water, filtered through sodium sulfate, concentrated to a small volume in vacuo and diluted with petroleum ether (B. P. 50-70°). The crystals which formed were filtered and washed with petroleum ether. Yield: 2.226 g.=53 per cent; M. P. 187-188°; 0.436 g.=10.5 per cent; M. P. 186.5-188°.

$3(a)$-acetoxy-11,20-diketopregnane (36) from $3(a)$-acetoxy-11,20 - diketo - 12 - bromopregnane (32).—453 mg. (0.001 mole) of $3(a)$-acetoxy-11,-20-diketo-12-bromopregnane (M. P. 187-188°) was dissolved in 20 ml. of glacial acetic acid, 1 g. of powdered zinc was added and the reaction mixture was heated on the steam bath 15 minutes. The zinc was removed by filtration and the filtrate was evaporated to dryness in vacuo. The residue was distributed between water and benzene and the solution was washed with water. The benzene solution was filtered through sodium sulfate, concentrated in vacuo to a small volume and diluted with petroleum ether (B. P. 50-70°). Crystals formed. Yield: 100 mg., M. P. 132-134°; 162 mg., M. P. 133-135°. The product did not depress the melting point of $3(a)$acetoxy-11,20-diketopregnane.

It has also been found that the conversion of 3,9-epoxy-11-keto-24,24 - diphenyl - $\Delta^{23}$ - cholene into $3(a)$-acyloxy-11-keto-12-bromo - 24,24 - diphenyl-$\Delta^{23}$-cholenes may be even more effectively carried out by treating the epoxy compound with dry hydrogen bromide in non-acylating solvents, such as chloroform alone, and thereafter converting the $3(a)$-hydroxy-11-keto-12-bromo-24,24-diphenyl-$\Delta^{23}$-cholene into the desired $3(a)$-acyloxy derivative by treatment with an acylating agent such as the acid anhydrides. For example, the $3(a)$-hydroxy compound may be converted to the $3(a)$-acetoxy derivative (29) by boiling with acetic anhydride. Acetic anhydride is also an excellent medium for the recrystallization of the $3(a)$-acetoxy compound (29). This procedure is illustrated by the following example:

$3(a)$-acetoxy-11 - keto - 12 - bromo - 24,24 - diphenyl-$\Delta^{23}$-cholene (29) from 3,9-epoxy-11-keto-bisnorcholanyldiphenylethylene.—50.00 g. of 3,9-epoxy - 11 - ketobisnorcholanyldiphenylethylene was dissolved in 60 ml. of dry alcohol-free chloroform. The reaction mixture was cooled in a Dry Ice-acetone bath and 125 g. of dry hydrogen bromide was introduced. The flask was sealed at Dry Ice temperature and then placed in an ice bath for 48 hours. The flask was cooled in a Dry Ice-acetone bath and the solution was poured onto chipped ice. Chloroform was added, the aqueous phase was separated and the organic phase was washed with water, sodium carbonate, and again with water. The chloroform solution was filtered through sodium sulfate, concentrated in vacuo to a small volume and the last traces of chloroform were displaced with acetic anhydride. The acetic anhydride solution was boiled for four hours and cooled. The crystals of the $3(a)$ acetoxy compound (29) which formed were filtered and washed with acetic anhydride.

I claim:

1. $3(a)$-acetoxy-11-keto-12-bromo - 24,24 - diphenyl-$\Delta^{20:22,23:24}$-choladiene.

2. Process for the production of $3(a)$-acyloxy-11-keto-12-bromo-24,24-diphenyl-$\Delta^{20:22,23:24}$- choladiene which comprises reacting 3,9-epoxy-11-keto-24,24-diphenyl-$\Delta^{23}$-cholene with hydrogen bromide, converting the resulting $3(a)$-hydroxy-11-keto-12-bromo-24,24-diphenyl-$\Delta^{23}$-cholene into the corresponding $3(a)$-acyloxy derivative by treatment with an acylating agent, and reacting the $3(a)$-acyloxy compound with N-bromosuccinimide to produce $3(a)$-acyloxy-11-keto-12-bromo-24,24-diphenyl-$\Delta^{20:22,23:24}$-choladiene.

3. Process for the production of $3(a)$-acetoxy-11-keto-12-bromo-24,24-diphenyl-$\Delta^{20:22,23:24}$- choladiene which comprises reacting 3,9-epoxy-11-keto-24,24-diphenyl-$\Delta^{23}$-cholene with hydrogen bromide, converting the resulting $3(a)$-hydroxy-11-keto-12-bromo-24,24-diphenyl-$\Delta^{23}$-cholene into the corresponding $3(a)$-acetoxy derivative by treatment with acetic anhydride, and reacting the $3(a)$-acetoxy compound with N-bromosuccinimide to produce $3(a)$-acetoxy-11-keto-12-bromo-24,24-diphenyl-$\Delta^{20:22,23:24}$-choladiene.

4. Process for the preparation of $3(a)$-acetoxy-11-keto-12-bromo-24,24-diphenyl-$\Delta^{20:22,23:24}$- choladiene which comprises reacting 3,9-epoxy-11-keto-24,24-diphenyl-$\Delta^{23}$-cholene with hydrogen bromide in the presence of acetic anhydride and reacting the resulting $3(a)$-acetoxy-11-keto-12-bromo-24,24-diphenyl-$\Delta^{23}$-cholene with N-bromosuccinimide.

5. $3(a)$-acetoxy-11-keto-12-bromo - 24,24 - diphenyl-$\Delta^{23}$-cholene.

6. The step in the process of making $3(a)$-acyloxy-11-keto-12-bromo-24,24 - diphenyl - $\Delta^{23}$-cholenes which comprises reacting 3,9-epoxy-11-keto-24,24-diphenyl-$\Delta^{23}$-cholene with hydrogen bromide.

7. The method for producing $3(a)$-acyloxy-11-keto-12 - bromo - 24,24 - diphenyl - $\Delta^{23}$ - cholenes which comprises reacting 3,9-epoxy-11-keto-24,-24-diphenyl-$\Delta^{23}$-cholene with hydrogen bromide and reacting the $3(a)$-hydroxy-11-keto-12- bromo-24,24-diphenyl-$\Delta^{23}$-cholene thereby produced with an acylating agent.

8. The method for producing 3($a$)-acetoxy-11-keto-12-bromo-24,24-diphenyl-$\Delta^{23}$-cholene which comprises reacting 3,9-epoxy-11-keto-24,24-diphenyl-$\Delta^{23}$-cholene with hydrogen bromide and reacting the 3($a$)-hydroxy-11-keto-12-bromo-24,24-diphenyl-$\Delta^{23}$-cholene thereby produced with acetic anhydride.

9. The method for producing 3($a$)-acetoxy-11-keto-12-bromo-24,24-diphenyl-$\Delta^{23}$-cholene which comprises reacting 3,9-epoxy-11-keto-24,24-diphenyl-$\Delta^{23}$-cholene with hydrogen bromide in the presence of acetic anhydride.

EDWARD C. KENDALL.

REFERENCES CITED

The following references are of record in the file of this patent:

UNITED STATES PATENTS

| Number | Name | Date |
| --- | --- | --- |
| 2,461,563 | Miescher | Feb. 15, 1949 |